(12) United States Patent
Iida et al.

(10) Patent No.: US 7,928,610 B2
(45) Date of Patent: Apr. 19, 2011

(54) TWO-HAND SWITCH DEVICE

(75) Inventors: Tatsuya Iida, Kyoto (JP); Manabu Shutto, Osaka (JP); Hiroaki Furukawa, Kasugai (JP); Toshiki Koshi, Tokyo (JP); Takashi Tanaka, Kadoma (JP)

(73) Assignees: Omron Corporation, Kyoto (JP); IDEC Corporation, Osaka (JP); SUNX Limited, Kasugai-shi, Aichi (JP); Yamataka Corporation, Tokyo (JP); Panasonic Electric Works Co., Ltd., Kadoma-shi, Osaka (JP)

( * ) Notice: Subject to any disclaimer, the term of this patent is extended or adjusted under 35 U.S.C. 154(b) by 282 days.

(21) Appl. No.: 11/817,306

(22) PCT Filed: Jul. 12, 2006

(86) PCT No.: PCT/JP2006/313859
§ 371 (c)(1),
(2), (4) Date: Dec. 3, 2008

(87) PCT Pub. No.: WO2007/010797
PCT Pub. Date: Jan. 25, 2007

(65) Prior Publication Data
US 2009/0146506 A1    Jun. 11, 2009

(30) Foreign Application Priority Data
Jul. 19, 2005    (JP) .................... 2005-208926

(51) Int. Cl.
*H02H 11/00*    (2006.01)
*H04B 1/02*    (2006.01)
(52) U.S. Cl. ........................... 307/326; 307/328
(58) Field of Classification Search ............ 307/326, 307/328
See application file for complete search history.

(56) References Cited

U.S. PATENT DOCUMENTS

| | | | |
|---|---|---|---|
| 5,168,173 A | 12/1992 | Windsor | |
| 6,862,433 B2 * | 3/2005 | Callaway, Jr. | ........ 455/101 |
| 2003/0174043 A1 | 9/2003 | Schumacher | |

FOREIGN PATENT DOCUMENTS

FR    2 420 716    10/1979

(Continued)

OTHER PUBLICATIONS

European Patent Office Search Report on Application No. 06768123.9 mailed Jul. 12, 2010; 6 pages.

*Primary Examiner* — Hal I Kaplan
(74) *Attorney, Agent, or Firm* — Foley & Lardner, LLP (57) ABSTRACT

Task—To provide a two-hand switch device that requires only a small load for each operation cycle.
Means to Achieve the Task—The device comprises a left hand RF antenna placed in such a position as to enable a communication with the first RFID tag worn on the predetermined position of the left hand of the worker only when the left hand of the worker is placed in a pre-determined left hand safe position, a right hand RF antenna placed in such a position as to enable a communication with the second RFID tag worn on the pre-determined position of the right hand of the worker only when the right hand of the worker is placed in a pre-determined right hand safe position and an output signal generating means for generating an output signal according to signals received by the left hand RF antenna and the right hand RF antenna.

10 Claims, 8 Drawing Sheets

FOREIGN PATENT DOCUMENTS

| | | |
|---|---|---|
| FR | 2 807 139 | 10/2001 |
| JP | 05-212597 | 8/1993 |
| JP | 10-180495 | 7/1998 |
| JP | 2000-046291 | 2/2000 |
| JP | 2000-271797 | 10/2000 |
| JP | 2002-137100 | 5/2002 |

* cited by examiner

(a) left antenna storage area     (b) right antenna storage area

TWO-HAND SWITCH DEVICE

TECHNICAL FIELD

The present invention relates to a two-hand switch device that can be operated only when both hands of a worker are placed in pre-determined safe positions so that a machine such as a press is prevented from activating when a hand of the worker is in a hazardous part.

BACKGROUND OF THE INVENTION

Conventionally known are two-hand switch devices that can be operated only when both hands of a worker are placed in pre-determined safe positions so that a machine such as a press is prevented from activating when a hand of the worker is placed in a hazardous part. See Patent Document #1, for instance.

In the case of a press, a left hand safe position and a right hand safe position are designated some distance away from a work piece charge inlet of the press in a laterally spaced apart relationship. Each of the left and right hand safe positions is typically fitted with a push button switch having a relatively large button head. Only when both of the push button switches are depressed, a pre-determined signal is produced from the two-hand switch device. The output signal is used as a condition for activating a press stroke of the press, determining an activation timing of a press stroke and so on.

The right and left push button switches are adequately spaced apart from each other so that the two switches may not be depressed by using one hand, and are each fitted with a relatively strong return spring.

Therefore, when performing a press work by operating the two-hand switch device, the worker is required to place his right and left hands on the right and left push button heads, respectively, and forcibly depress the two push button switches. Thereby, the press stroke of the press is prevented from being initiated when a hand of the worker is placed in a hazardous part of the press.

In a sensor type press controller that involves a condition for activating the press based on the blocking of sensor light, it is conventionally known to fit a transmitter to each wrist of the worker and control the condition for activating the press for each different worker identified by an ID code transmitted from the corresponding transmitter.

[Patent Document #1]
Japanese patent laid open (kokai) publication No. 05-212597

[Patent Document #2]
Japanese patent laid open (kokai) publication No. 10-180495

BRIEF SUMMARY OF THE INVENTION

Task to be Accomplished by the Invention

However, because such a two-hand push button switch device uses push button switches that are each fitted with a strong return spring, the burden on the worker for each activation is so heavy that the worker suffers from excessive fatigue after repeating a large number of cycles of operation. As a result, the worker is tempted to resort to improper modes of operation such as keeping one of the push buttons depressed by using adhesive tape so that the machine may be operated by using only one hand for depressing the other push button switch.

Also, because a conventional two-hand push button switch device can produce a normal output signal as long as the two push button switches are depressed simultaneously, it was not possible to exclude the possibility of improper or prankish modes of operation such as depressing the two push button switches by two workers each using only one hand, depressing one of the push button switches by using a long pole, and depressing the two push buttons by two hands but with the reversed hands of the worker facing away from the machine.

In such a conventional press fitted with a two-hand switch device, if a worker identification system or a worker logging system is introduced, it may be possible to identify the worker who is generally involved in the operation of the press (such as the one who initially powers up the press) from an ID obtained from an ID card of the like carried by each worker but it is difficult to identify the actual worker who is directly involved in the press work itself which may be considered as most hazardous.

The present invention was made in view of such problems of the prior art, a primary object of the present invention is to provide a two-hand switch device that requires only a small work load for each operation cycle and thereby does not cause excessive fatigue to the worker even after a large number of operation cycles.

Another object of the present invention is to provide a two-hand switch device that is reliable in operation and is not activated by any improper mode of operation other than the proper mode of operation using the both hands of a worker.

Yet another object of the present invention is to provide a two-hand switch device that can accurately identify the worker who operated the two-hand switch device.

Other objects and advantages of the present invention will become more apparent for a person skilled in the art from the following description.

Means to Accomplish the Task

The two-hand switch device of the present invention comprises a first RFID tag configured to be worn on a pre-determined position of a left hand of a worker; a second RFID tag configured to be worn on a pre-determined position of a right hand of the worker; a left hand RF antenna placed in such a position as to enable a communication with the first RFID tag worn on the pre-determined position of the left hand of the worker only when the left hand of the worker is placed in a predetermined left hand safe position; a right hand RF antenna placed in such a position as to enable a communication with the second RFID tag worn on the pre-determined position of the right hand of the worker only when the right hand of the worker is placed in a pre-determined right hand safe position; and an output signal generating means for generating an output signal according to signals received by the left hand RF antenna and the right hand RF antenna.

According to this arrangement, once the two hands of the worker are placed in the corresponding safe positions, a communication is automatically made between the first RFID tag and left hand RF antenna and between the second RFID tag and right hand RF antenna, and an output signal is generated as a result of this communication.

Therefore, according to this two-hand switch device, because a pre-determined output signal can be produced simply by displacing the two hands of the worker to the corresponding safe positions, as compared to the two-hand switch device using conventional push button switches, the operation load for each work cycle is reduced, and the worker is avoided from being excessively fatigued even after repeating work cycles over a prolonged period of time.

Also, the range of communication between the RFID tags and RF antennas can be limited to a small area around each safe position by suitably selecting the transmission power, transmission frequency and antenna directivity. Therefore, even though the activation means is changed from push button switches to radio wave transceivers, the positioning of the two hands can be adequately constrained, and the responsiveness of the switch device is not impaired in any way.

In other words, unless the worker places his both hands in the corresponding safe positions, the two-hand switch device cannot be operated. Therefore, the hands of the worker are positively constrained to the safe positions on account of the operation of the switch device so that the hands of the worker are positively protected from the source of danger.

Unless the two hands of the worker are placed in the corresponding safe positions, a communication between the tags and antennas is not initiated. Furthermore, once one of the worker's hands is moved away from the corresponding safe position or is moved out of the directivity range of the correspond antenna, the communication between the tag and antenna is immediately disconnected. Therefore, the output signal can be finely controlled by detecting a slight movement of each hand.

Furthermore, each tag may store various pieces of management data, and this data can be read by the switch device at will through the communication between the tag and antenna. Therefore, the device of the present invention can function not only as a normal switch device but also as a RF tag reader.

By taking advantage of this feature, it is possible to accumulate data in association with the workers who are actually involved in the operation of the machine by associating the operation of the two-hand switch device and the data read out from each worker, and use the obtained data for useful purposes.

According to a preferred embodiment of the present invention, the output signal generating means generates an output signal of a multi state output type that takes a first logic value at a state where both the signals from the left hand RF antenna and the right hand RF antenna are simultaneously present and otherwise takes a second logic value.

According to this arrangement, because the logic state of the output signal changes depending on if the both hands of the worker are in the corresponding safe positions or not, the machine such as a press that uses the output signal of the two-hand switch device can immediately determine if a potentially hazardous work can be executed or not according to the logic value of the output signal itself.

According to another preferred embodiment of the present invention, the output signal generating means generates an output signal of a multi state output type and generates a one shot pulse upon start and/or upon end of a state where the signals from the left hand RF antenna and the right hand RF antenna are simultaneously present.

According to this arrangement, because the timings of the two hands of the worker reaching the corresponding safe positions and leaving the corresponding safe positions can be determined by monitoring the timings of the occurrence of a one shot pulse in the output signal, the machine such as a press that uses the output signal of the two-hand switch device can determine if the two hands of the worker are in the corresponding safe positions by retaining an output signal from the timings of the arrival and departure of the both hands at and from the corresponding safe positions.

According to yet another preferred embodiment of the present invention, the first RFID tag stores left hand identification information, and the second RFID tag stores right hand identification information, the output signal generating means generating a pre-determined output signal when the left hand identification information is received by the left hand RF antenna and the right hand identification information is received by the left hand RF antenna.

According to this arrangement, unless the left hand identification information is read by the left hand RF antenna and the right hand identification information is read by the right hand RF antenna, no output signal is generated from the output signal generating means. Therefore, it is possible to prohibit improper or prankish modes of operation such as depressing the two push button switches by two workers each using only one hand, depressing one of the push button switches by using a long pole, and depressing the two push buttons by two hands but with the reversed hands of the worker facing away from the machine, and the generation reliability of the output signals can be improved.

According to yet another embodiment of the present invention, the first RFID tag stores individual worker identification information, and the second RFID tag stores individual worker identification information, the output signal generating means generating a pre-determined output signal when the individual worker identification information received by the left hand RF antenna and the individual worker identification information received by the left hand RF antenna agree with each other.

According to this arrangement, unless the individual worker identification information read by the left hand RF antenna and the individual worker identification information read by the right hand RF antenna agree with each other, no output signal is generated from the output signal generating means. Therefore, it is possible to prohibit improper modes of operation such as depressing the two push button switches by two workers each using only one hand and depressing one of the push button switches by using a long pole, and the generation reliability of the output signals can be improved.

According to yet another embodiment of the present invention, the pre-determined left hand safe position and the pre-determined right hand safe position are located in front of a potentially hazardous machine and are laterally spaced apart from each other by a pre-determined distance.

According to this arrangement, when a work table is provided for charging work pieces to the working tool (potentially hazardous part) of a press, by placing the pre-determined left hand safe position and the pre-determined right hand safe position on the work table in a laterally spaced apart relationship, it is possible to positively prevent a situation where the press is activated when a worker's hand is placed in the potentially hazardous part.

According to yet another embodiment of the present invention, the left hand RF antenna and the right hand RF antenna each have a directivity, and are oriented so that the directivities of the two antennas are directed in mutually facing away directions.

According to this arrangement, because the left hand RF antenna and the right hand RF antenna each have a directivity, and are oriented so that the directivities of the two antennas are directed in mutually facing away directions, the range of communication for each RFID tag can be limited by the corresponding directivity and a high sensitivity can be achieved by increasing the transmission power because the two antennas are oriented so as to be directed in mutually facing away directions. Therefore, both the reception sensitivity and responsiveness can be improved at the same time.

According to yet another embodiment of the present invention, a screen is placed between the left hand and right hand RF antennas.

According to this arrangement, the physical presence of the screen prevents an improper mode of operation such as the reversing or crossing of the left and right hands.

Effect of the Invention

The present invention thus provides a two-hand switch device that requires a small load for each operation cycle, and does not cause excessive fatigue to the worker even after a large number of cycles of operation. Also, the present invention provides a highly reliable two-hand switch device that would not activate by any improper mode of operation other than by a proper mode of operation using the both hands of a worker. Further, the present invention provides a two-hand switch device than can accurately identify the worker who actually operated the two-hand switch device.

DETAILED DESCRIPTION OF THE PREFERRED EMBODIMENT(S)

Preferred embodiments of the two-hand switch device of the present invention are described in the following in more detail with reference to the appended drawings.

Figure 1:
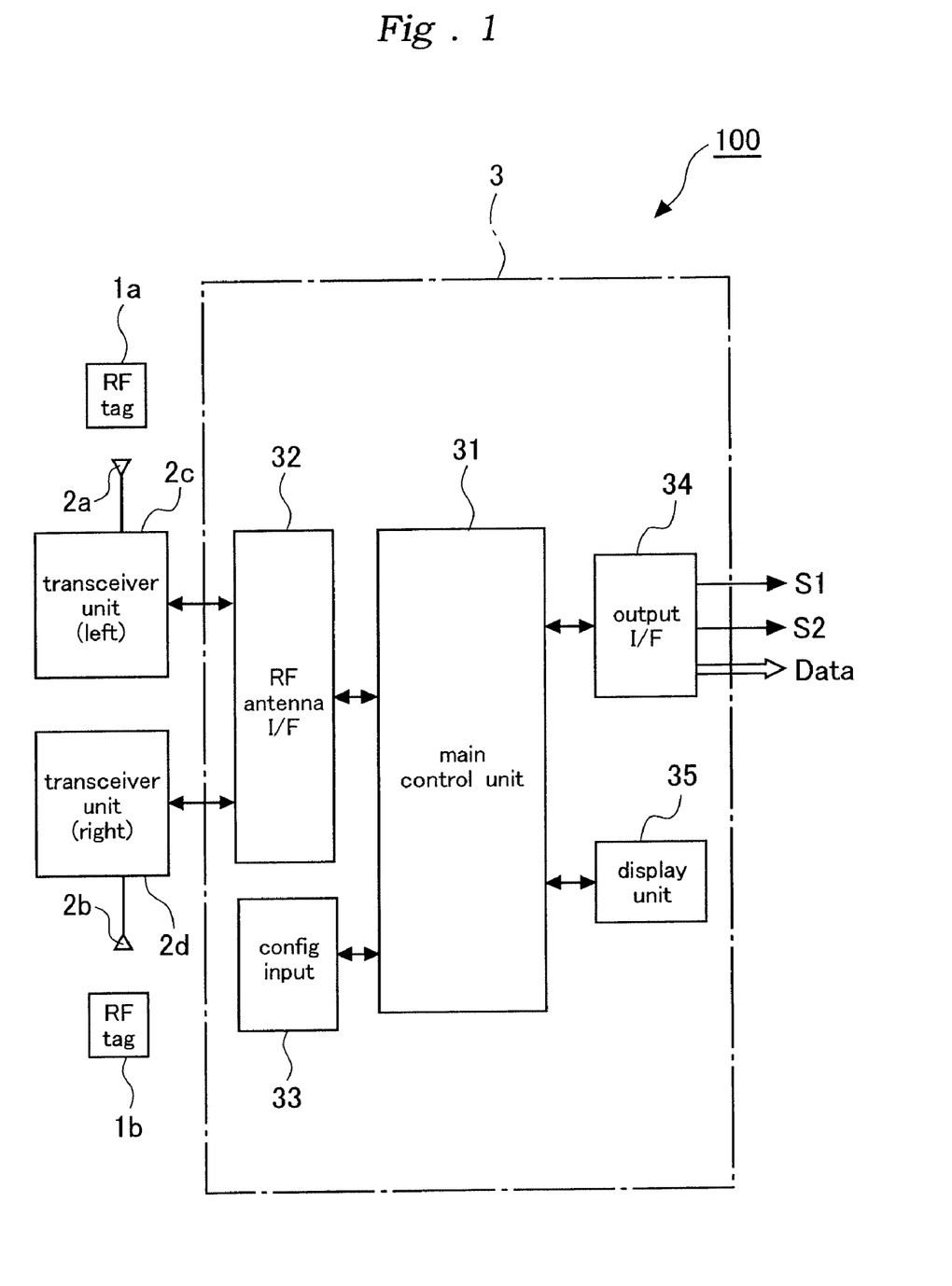
FIG. 1 is a block diagram of the two-hand switch device.

FIG. 1 shows a hardware diagram of an exemplary two-hand switch device embodying the present invention. As shown in this drawing, the two-hand switch device 100 comprises a first RFID tag 1a configured to be worn on a pre-determined position (such as a wrist and finger) of a left hand (10a in FIG. 6) of a worker, a second RFID tag 1b configured to be worn on a pre-determined position (such as a wrist and finger) of a right hand (10b in FIG. 6) of the worker, a left hand RF antenna 2a placed in such a position as to enable a communication with the first RFID tag 1a worn on the pre-determined position of the left hand of the worker only when the left hand of the worker is placed in a pre-determined left hand safe position (13a in FIG. 6), a right hand RF antenna 2b placed in such a position as to enable a communication with the second RFID tag 1b worn on the pre-determined position of the right hand of the worker only when the right hand of the worker is placed in a pre-determined right hand safe position (13b in FIG. 6), and a signal process unit 3 functioning as an output signal generating means for generating an output signal (S1, S2 and Data) according to signals received from a transceiver unit 2c of the left hand RF antenna 2a and a transceiver unit 2d of the right hand RF antenna 2b.

There are various design approaches to arrange that the left and right RF antennas 2a and 2b can communicate with the first and second RFID tags 1a and 1b worn on the pre-determined parts the left and right hands of the worker, respectively, only when the left and right hands of the worker are placed in the pre-determined left hand and right hand safe positions (13a and 13b in FIG. 6), respectively. For instance, such an arrangement can be produced by suitably combining the directivity, orientation, transmission power, transmission frequency and so on of each RF antenna.

The signal process unit 3 comprises a main control unit 31, a RF antenna interface 32, a configuration input unit 33, an input/output interface unit 34 and a display unit 35.

Figure 2:
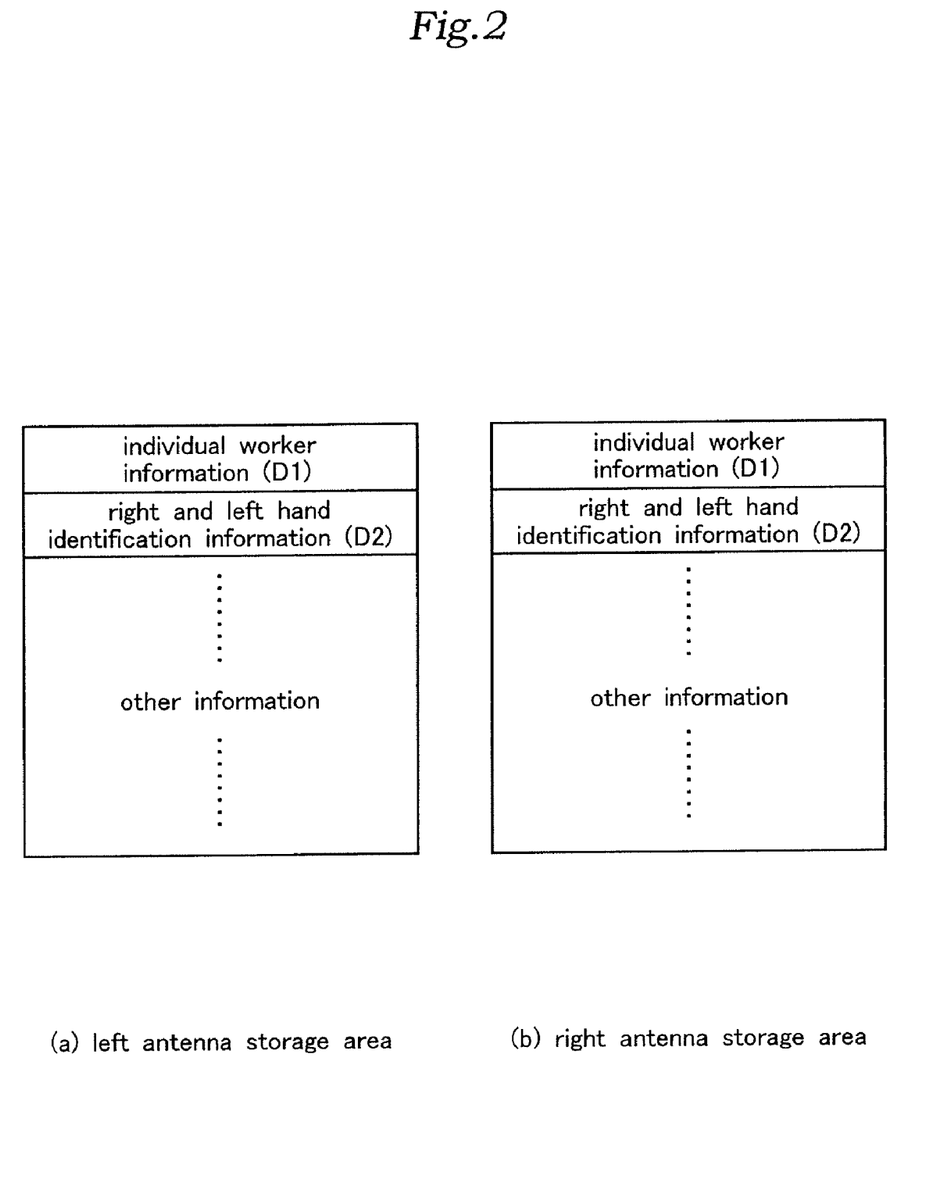
FIG. 2 is a diagram illustrating the left and right antenna storage areas.

The main control unit 31 controls the overall system, and typically comprises a microprocessor, ROM, RAM and peripheral support circuits. In this particular example, as illustrated in FIG. 2, the RAM is provided with a left antenna storage area (see FIG. 2a) for storing the reception information from the left hand RF antenna 2a and a right antenna storage area (see FIG. 2b for storing the reception information from the right hand RF antenna 2b.

As can be appreciated from the drawings, each of the antenna storage areas may store various pieces of safety information (such as worker skill information, permitted area information and permitted work information) and reception time information as well as individual worker information D1 and right and left hand identification information D2. The mode of using each antenna storage area is described hereinafter with reference to the flowchart of FIG. 4.

The RF antenna interface 32 is interposed between the main control unit 31 and the left hand and right hand RF antennas 2a and 2b to perform the function of an interface between the two parts. Owing primarily to the provision of the RF antenna interface 32, reading from the RFID tags 1a and 1b and writing into the RFID tags 1a and 1b are enabled.

The configuration input unit 33 comprises configuration switches such as DIP switches, and is used for entering various forms of mode selection information. The right and left hand identification option configuration and the individual worker identification option configuration described hereinafter are selected by using this configuration input unit 33.

The input/output interface unit 34 has the function to generate various output signals in response to a command from the main control unit 31. In the illustrated embodiment, the input/output interface unit 34 generates a state command signal S1, a state change command signal S2 and a data signal (Data).

Figure 7:
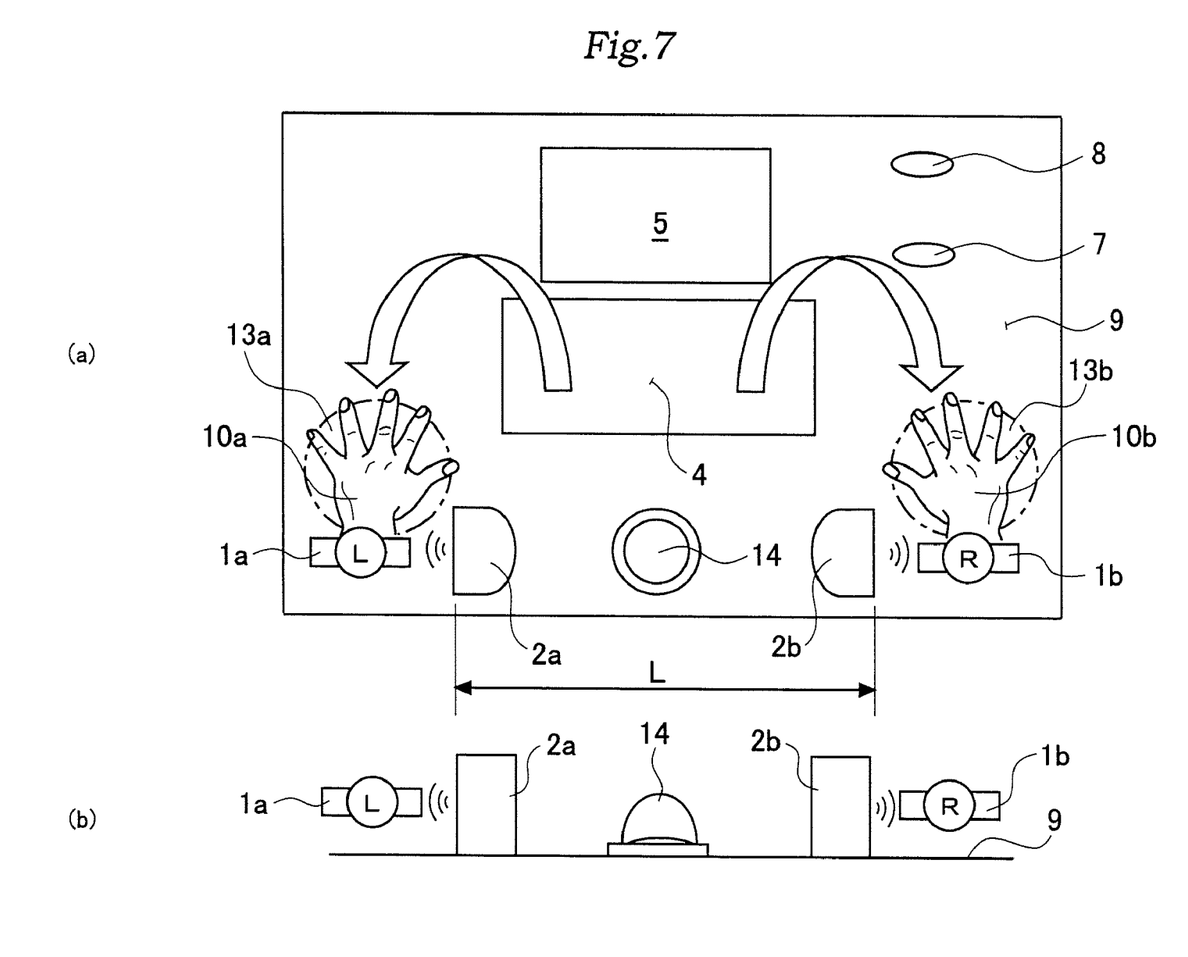
FIG. 7 illustrates the second mode of operation of the two-hand switch device.

The state command signal S1 indicates, for instance, that the left hand 10a of the worker is in the left hand safe position 13a and the right hand 10b of the worker is in the right hand safe position 13b (both-hand safe state) as shown in FIG. 7. More specifically, the state command signal S1 is "1" for the duration of the both-hand safe state and is otherwise "0".

The state change command signal S2 indicates a start and/or an end of the both-hand safe state. More specifically, the state change command signal S2 generates a one shot pulse (narrow-width pulse) upon start and/or end of the both-hand safe state.

The data signal (Data) means various forms of data (such safety management information) read from the left and right RFID tags 1a and 1b via the left and right RF antennas 2a and 2b. In other words, the illustrated two-hand switch device additionally has the function to read data from the left and right RFID tags 1a and 1b. Because this data is read from the RFID tags carried by the worker who operates the two-hand switch device, it is possible to collect various pieces of individual worker information of the worker who is actually involved in the operation of a potentially hazardous machine such as a press by using the two-hand switch device of the present invention.

The display unit 35 may consist of LED lamps or an LCD panel although not shown in the drawings, and indicates the operating state of the two-hand switch device.

Figure 3:
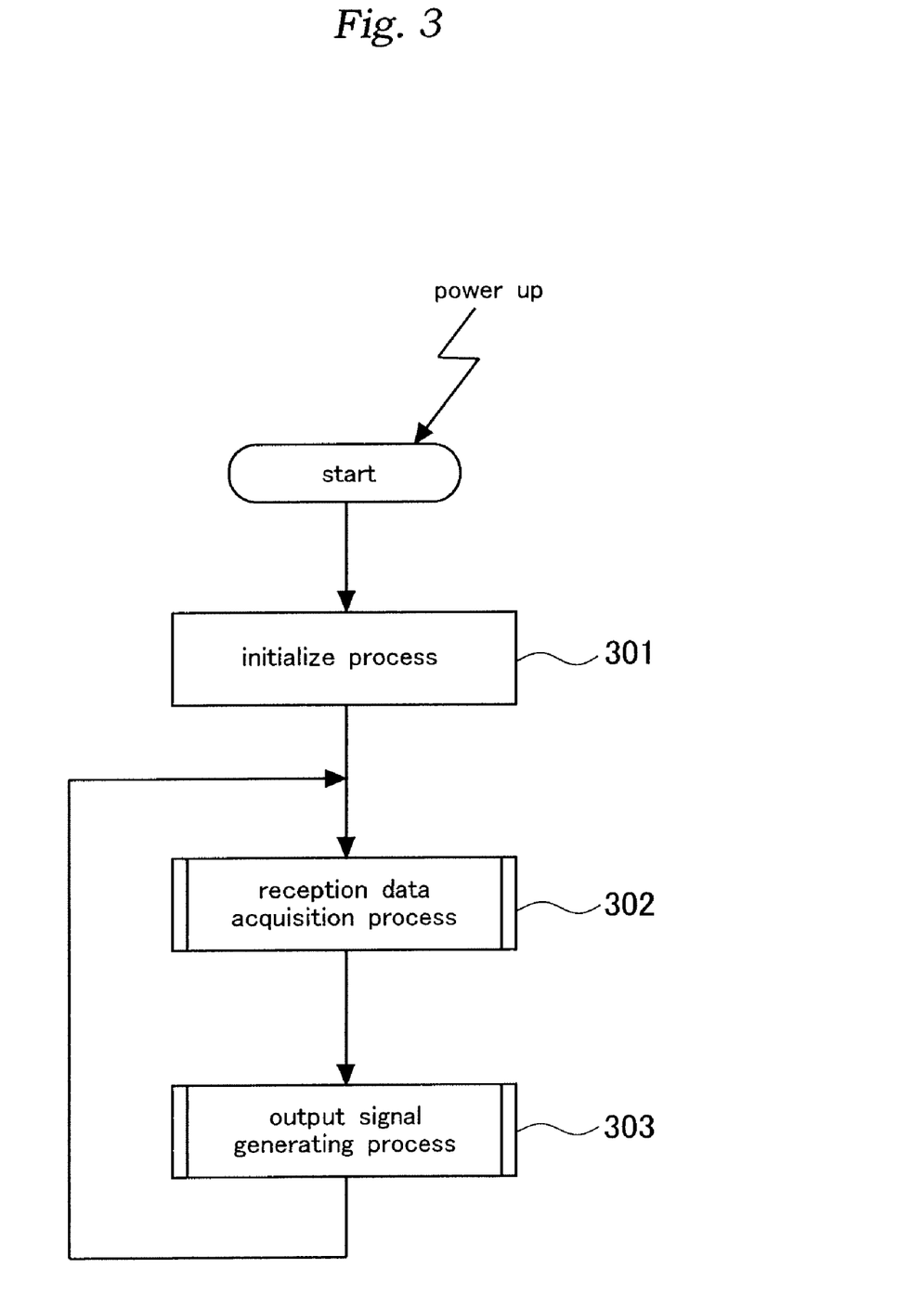
FIG. 3 is a general flowchart showing the overall process of the control unit of the two-hand switch device.

FIG. 3 shows a general flowchart of the overall process of the control unit of the two-hand switch device. As shown in the drawing, the control unit of the two-hand switch device is configured to execute an initialize process (step 301) immediate following power up, and repeat a reception data acquisition process (step 302) and an output signal generating process (step 303) one after the other.

The various pieces of data that are read from the left and right RFID tags 1a and 1b via the left and right RF antennas 2a and 2b, respectively, are stored in the left and right antenna storage areas (see FIGS. 2a and 2b) along with the corresponding time stamps in the reception data acquisition process (step 302). The details of the reception data acquisition process (step 302) are illustrated in FIG. 4.

Figure 4:
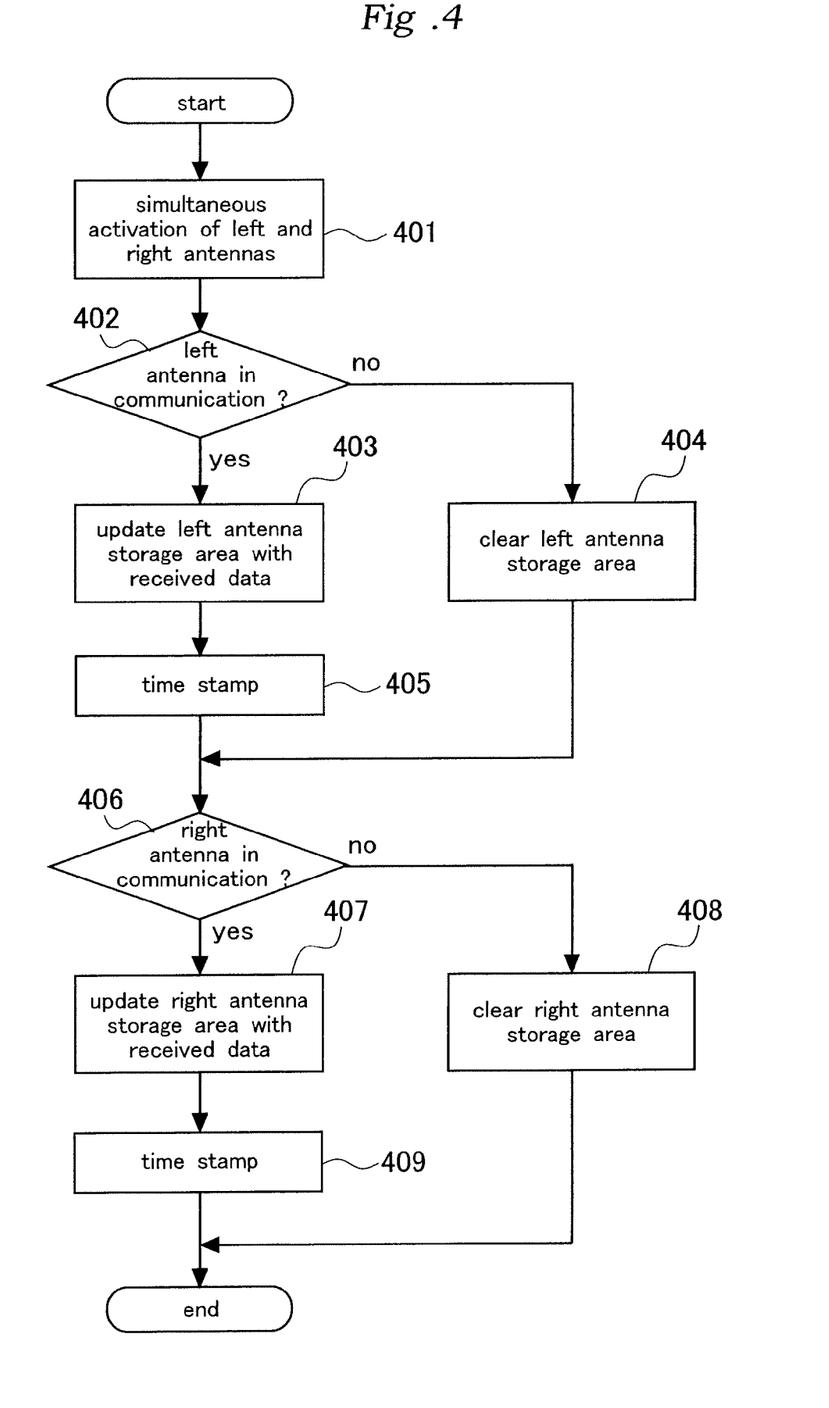
FIG. 4 is a flowchart showing the details of the reception data acquisition process.

Referring to FIG. 4, upon start of this process, the left and right RF antennas are simultaneously activated and RFID tags are looked for (step 401). If the left hand 10a of a worker is placed in the left hand safe position 13a and the RFID tag 1a worn on the wrist of the worker is thereby brought adjacent to the left RF antenna 2a, a communication is established between the RFID tag 1a and the left RF antenna 2a or a state of communication is produced, and the information stored in the RFID tag 1a is read.

On the other hand, if the left hand 10a of the worker is not placed in the left hand safe position 13a and the RFID tag 1a worn on the wrist of the worker is therefore not brought adjacent to the left RF antenna 2a, there is no communication between the RFID tag 1a and the left RF antenna 2a or a state of communication is not produced, and the information stored in the RFID tag 1a is not read.

If the left RF antenna 2a is determined to be in a state of communication (yes in step 402), the information read out from the RFID tag 1a is stored in the left antenna storage area (see FIG. 2a) allocated in the memory of the main control unit 31 (step 403). At the same time, a time stamp based on the accurate time data (in the order of 10 msec to 100 msec, for instance) obtained from an electronic clock circuit incorporated in the main control unit is attached to this data (step 405). This time stamp is used for determining the time difference between the right and left communication start time points as described hereinafter. If the left RF antenna 2a is determined to be not in a state of communication (no in step 402), the contents of the left antenna storage area (see FIG. 2a) are cleared (step 404). The word "clear" as used herein means both the cases where the data itself is erased and that the data itself remains but a predetermined state flag is cleared.

Thereafter, the determination of a state of communication is likewise performed with respect to the right RF antenna 2b (step 406). In this case, if the right hand 10b of the worker is placed in the right hand safe position 13b and the RFID tag 1b worn on the wrist of the worker is thereby brought adjacent to the right RF antenna 2b, a communication is established between the RFID tag 1b and the right RF antenna 2b or a state of communication is produced, and the information stored in the RFID tag 1b is read.

On the other hand, if the right hand 10b of the worker is not placed in the right hand safe position 13b and the RFID tag 1b worn on the wrist of the worker is therefore not brought adjacent to the right RF antenna 2b, there is no communication between the RFID tag 1b and the right RF antenna 2b or a state of communication is not produced, and the information stored in the RFID tag 1b is not read.

If the right RF antenna 2b is determined to be in a state of communication (yes in step 406), the information read out from the RFID tag 1b is stored in the right antenna storage area (see FIG. 2b) allocated in the memory of the main control unit 31 (step 407). At the same time, a time stamp based on the accurate time data (in the order of 10 msec to 100 msec, for instance) obtained from an electronic clock circuit incorporated in the main control unit is attached to this data (step 409). This time stamp is used for determining the time difference between the right and right communication start time points as described hereinafter. If the right RF antenna 2b is determined to be not in a state of communication (no in step 406), the contents of the right antenna storage area (see FIG. 2b) are cleared (step 408). The word "clear" as used herein means both the cases where the data itself is erased and that the data itself remains but a pre-determined state flag is cleared.

Referring once again to FIG. 3, it is determined in the output signal generating process (step 303) if the conditions for generating an output signal are satisfied according to the information stored in the left and right antenna storage areas (see FIG. 2). If the conditions are satisfied, an output signal is generated. The details of the process of generating an output signal are illustrated in FIG. 5.

Figure 5:
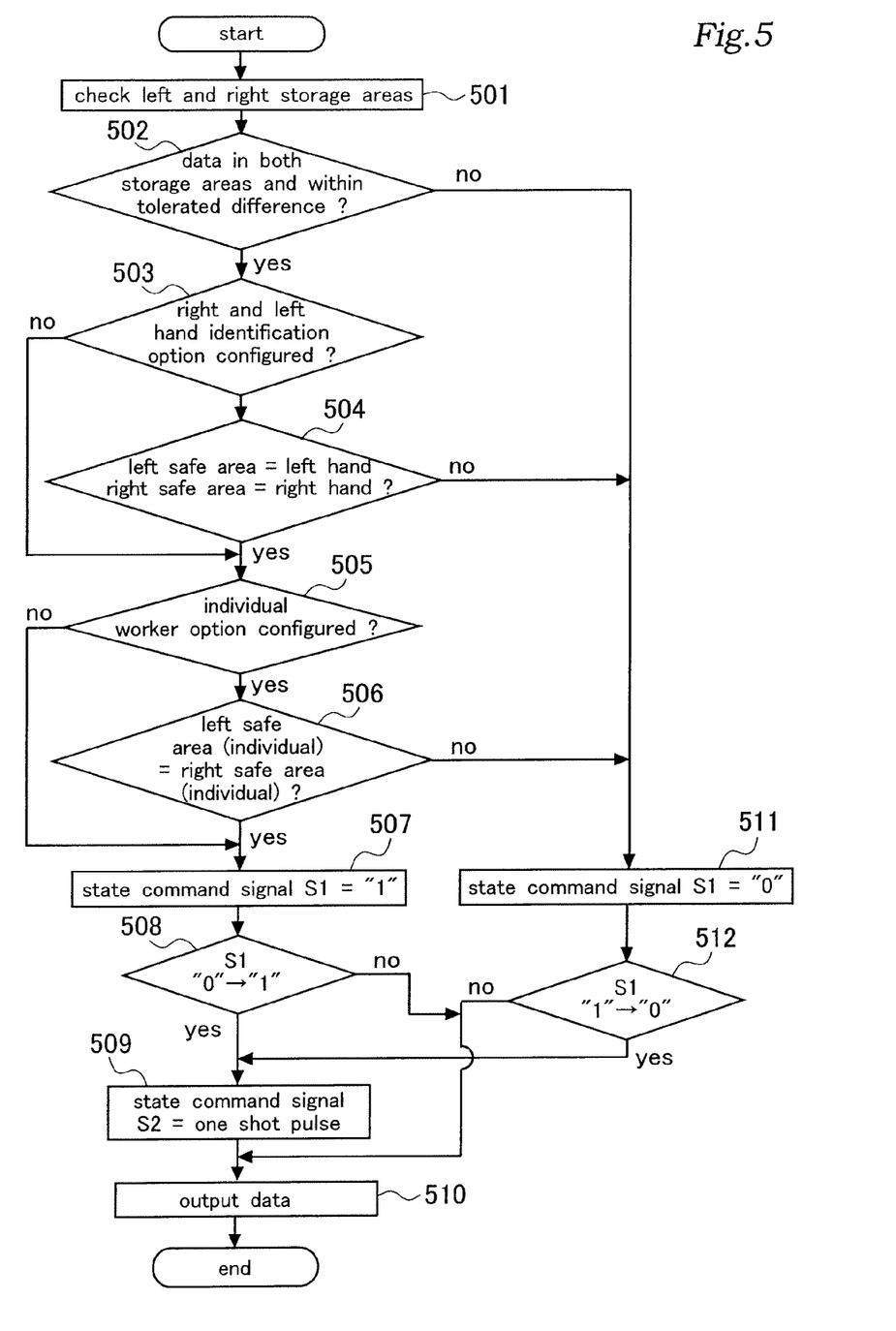
FIG. 5 is a flowchart showing the details of the output signal generating process.

Referring to FIG. 5, upon start of this process, the left and right antenna storage areas are checked (step 501). The RFID tags carried by each worker each store various pieces of safety information (such as worker skill information, permitted area information and permitted work information) and reception time information as well as individual worker information D1 and right and left hand identification information D2. Such information is read from the RFID tags, and is stored in the left and right antenna storage areas (see FIG. 2).

It is then determined if data is stored in both of the left and right antenna storage areas (see FIG. 2) and if the time difference between the left and right reception time points is within a tolerance (0.5 seconds, for instance) (step 502). That data is stored in both of the left and right antenna storage areas means that both the left hand and right hand RF antennas 2a and 2b are in a state of communication. That the time difference between the left and right reception time points is within a tolerance means that the both hands of the worker are placed on the left and right safe positions with an intention to activate the switch device. In other words, even when one hand is placed on one of the left and right safe positions while resting and the other hand thereafter happens to be placed on the other of the left and right safe positions by accident, the two-hand switch device is not activated even though the both hands are inadvertently simultaneously placed in the left and right safe positions.

If the both storage areas contain data and the time difference is within the tolerance (yes in step 502), it is then determined if the right and left hand identification option is configured (step 503). The "right and left hand identification option" as used herein means an operation mode in which a pre-determined output signal is generated on the condition that the left hand identification information is received from the left RF antenna 2a and the right hand identification information is received from the right RF antenna 2b. The selection of the right and left hand identification option can be effected by operating the DIP switch forming a part of the configuration input unit 33.

When it is determined that the right and left hand identification option is configured (yes in step 503), it is then determined if the left and right hand identification information stored in the left antenna storage area in fact indicates a "left hand", and the left and right hand identification information stored in the right antenna storage area in fact indicates a "right hand" (a left hand in the left hand safe area and a right hand in the right hand safe area) according to the contents (in particular, left and right hand identification information) of the left and right antenna storage areas (step 504). If it is determined that a left hand is in the left hand safe area and a right hand is in the right hand safe area (yes in step 504), it is then determined if the individual worker identification option is configured (step 505).

The "individual worker identification option" as used herein means an operation mode in which a pre-determined output signal is generated on the condition that the individual worker identification information received from the left hand RF antenna agrees with the individual worker identification information received from the right hand RF antenna. The selection of the individual worker identification option can be also effected by operating the DIP switch forming a part of the configuration input unit 33.

When it is determined that the individual worker identification option is configured (yes in step 505), it is determined if the individual worker identification information received by the left RF antenna 2a and the individual worker identification information received by the right RF antenna 2a agree with each other based on the contents of the left and right antenna storage areas (in particular the individual worker identification information) (step 506). If the two versions of the individual worker identification information agree with each other (yes in step 506), because the necessary conditions are satisfied, the program flow advances to the process of generating an output signal.

When the necessary conditions are satisfied, and the program flow has advanced to the process of generating an output signal, first of all, the state command signal S1 is set to "1" (step 507). It is then determined if the content of the state command signal S1 has changed from "0" to "1" (step 508). If such a change has indeed occurred (yes in step 508), a one shot pulse is produced (step 509) as a state change command signal S2. On the other hand, when no such change has occurred (no in step 508), the step of generating a one shot pulse (step 509) is skipped, and no one shot pulse is produced.

Next is executed a data output process (step 510) in which a pre-determined piece of information of the information stored in the left and right antenna storage areas (see FIG. 2) is produced to the outside of the system. This piece of information is forwarded to a potentially hazardous machine that is to be controlled or a dedicated safety management system for use in various forms of safety management control.

If there is no data in both the antenna storage areas (see FIG. 2) (no in step 502), the result of the left and right hand determination process on the presence of a left hand in the left region and a right hand in the right region is negative (no in step 504), or the individual worker identification information of the left region disagrees with that of the right region (no in step 506), the program flow advances to an output signal generating process for a situation where the necessary conditions are not satisfied.

In the output signal generating process for a situation where the necessary conditions are not satisfied, first of all, the state command signal S1 is set to "0" (step 511). It is then determined if the content of the state command signal S1 has changed from "1" to "0" (step 512). If such a change has indeed occurred (yes in step 512), a one shot pulse is produced (step 509) as a state change command signal S2. On the other hand, when no such change has occurred (no in step 508), the step of generating a one shot pulse (step 509) is skipped, and no one shot pulse is produced.

In the foregoing description, if no left and right hand identification option is configured (no in step 503), step 504 is skipped, and the operation mode corresponding to the left and right hand identification option is not invoked. Similarly, if no individual worker identification option is configured (no in step 505), step 506 is skipped, and the operation mode corresponding to the individual worker identification option is not invoked.

A possible application of the two-hand switch device embodying the present invention is described in the following with reference to FIGS. 6 to 8.

Figure 6:
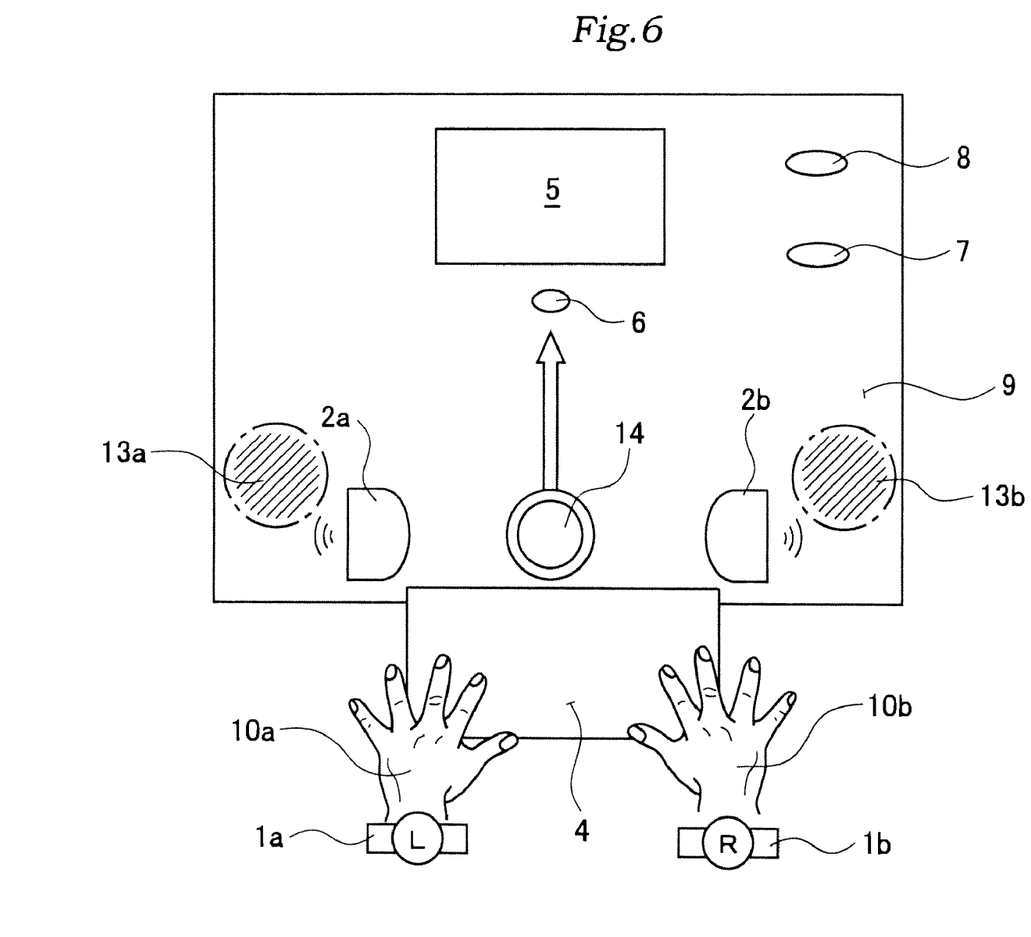
FIG. 6 illustrates the first mode of operation of the two-hand switch device.

FIGS. 6 and 7 illustrate the mode of operation of an exemplary two-hand switch device of the present invention when applied to a press. A work table 9 is provided in front of a hazardous part 5 of the press (where a punch engages a die) to facilitate the feeding of work pieces that are to be pressed. As seen from the worker, the hazardous part 5 is located on the other side of the work table 9, and a left hand safe position 13a and a right hand safe position 13b are located on the work table, somewhat more to this side of the work table 9, on either lateral side thereof, separated from each other by a distance L. The distance L, in this case, is about the bideltoid breadth of a worker, and it is not possible for one arm to communicate with both of the two antennas 2a and 2b.

A left RF antenna 2a is provided adjacent to the left hand safe position 13a, and a right RF antenna 2b is provided adjacent to the right hand safe position 13b. Each RF antenna 2a, 2b is given with a directivity directed laterally outward. In the illustrated embodiment, the left and right antennas 2a and 2b are mounted on the work table in such a manner that the directivity of the left RF antenna 2a is directed leftward, and the directivity of the right RF antenna 2b is directed rightward. In other words, the left and right RF antennas 2a and 2b are given with directivities which are directed in mutually facing away directions.

Meanwhile, a first RFID tag 1a is worn on the wrist of the left hand 10a of the worker, and a second RFID tag 1b is worn on the wrist of the right hand 10b of the worker. The left RF antenna 2a is placed in such a position as to be able to communicate with the first RFID tag 1a worn on the wrist of the left hand 10a of the worker only when the left hand 10a of the worker is in a pre-determined left hand safe position 13a. Similarly, the right RF antenna 2b is placed in such a position as to be able to communicate with the second RFID tag 2b worn on the wrist of the right hand 10b of the worker only when the right hand 10b of the worker is in a pre-determined right hand safe position 13b.

Numeral 6 denotes a presence sensor for detecting the presence of a work piece 4 in the hazardous part 5, numeral 7 a reset switch, numeral 8 a main switch, and numeral 14 an emergency stop switch. The main switch 8 is used for putting the press in a state ready for operation, and the presence sensor 6 is used for an internal interlock that prevents the initiation of a press work process even when the two-hand switch device is activated unless a work piece 4 is placed in the hazardous part 5.

The emergency stop switch 14 is used for stopping the press at the time of an emergency.

A programmable controller (PLC) not shown in the drawings performs repeated cycles of press work and works work pieces by executing a pre-determined user program written in a ladder diagram language or the like and suitably controlling the actuating unit of the press according to the output signal (such as S1, S2 and Data) of the two-hand switch device of the present invention, the output from the presence sensor 6, the output of the main switch 8 and so on.

The mode of operation for a worker conducting a press work by using the foregoing structure is described in the following. First of all, the worker holds the two ends of a work piece 4 using his both hands 10a and 10b, and pushes out his both arms forward to deliver the work piece 4 forward into the hazardous part 5.

This activates the presence sensor 6 placed immediately in front of the hazardous part and the PLC is notified of the placement of the work piece 4 in the hazardous part 5 to thereby relieve the interlock that has been preventing the initiation of the press work.

Thereafter, the worker pulls back his both hands and brings them to the left and right hand safe positions 13a and 13b by turning his left hand 10a counter clockwise and his right hand 10b clockwise as illustrated in FIG. 7.

As a result, the first RFID tag 1a worn on the wrist of the left hand 10a is placed in a state of communication with the left hand RF antenna 2a, and the second RFID tag 1b worn on the wrist of the right hand 10b is placed in a state of communication with the right hand RF antenna 2b so that an output signals S1, S2 and safety management data (Data) are produced from the input/output interface 34, and are forwarded to a PLC not shown in the drawing.

The user program of the PLC not shown in the drawings is able to execute the press work safely according to the output signal S1, S2 and safety management data (Data). For instance, when the logic value of the state command signal S1 is "1", as it means that the left and right hands 10a and 10b of the worker are in the left and right safe positions 13a and 13b, respectively, it is possible to prevent the risk of performing a press work with a worker's hand placed in the hazardous part and ensure the safety of the worker by managing the initiation and operation of each press cycle on the condition that the logic value of the state command signal S1 is "1".

As the state change command signal S2 consists of a one shot pulse at the start and end of the time interval during which the both hands are in the safe positions, it is possible to similarly ensure the safety of the worker by initiating a press cycle upon occurrence of such a one shot pulse or in synchronism with the displacement of the two hands of the worker to the corresponding safe positions.

The left hand RF antenna 2a and right hand RF antenna 2b are each provided with a directivity, and are oriented so as to be directed in mutually facing away directions so that the range of communication for each RFID tag can be limited by the corresponding directivity and a high sensitivity can be achieved by increasing the transmission power because the two antennas are oriented so as to be directed in mutually facing away directions. Therefore, both the reception sensitivity and responsiveness can be improved at the same time.

Also, as the safety management information contains such information as worker skill information, permitted area information and permitted work item information, it is possible to authorize the operation of the press only to those workers who are determined to have a pre-determined safety or other necessary qualification from such information.

Figure 8:
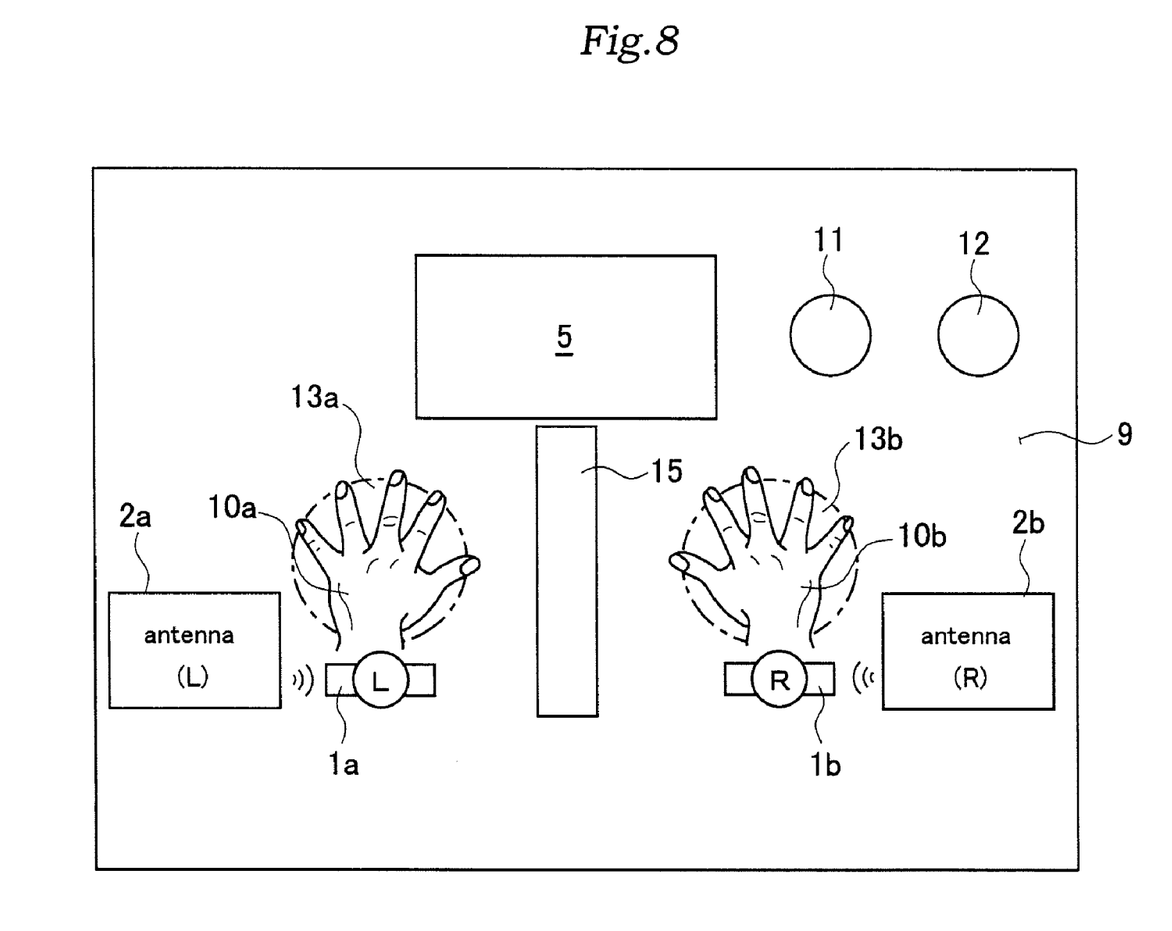
FIG. 8 illustrates an application of the two-hand switch device.

Another possible application of the two-hand switch device is illustrated in FIG. 8. In this example, a screen 15 is placed between the left and right antennas 2a and 2b for the purpose of preventing an improper mode of operation such as the reversing or crossing of the left and right hands. Each RF antenna 2a, 2b is given with a directivity, and is oriented so as to have the directivities to be both directed inward.

INDUSTRIAL APPLICABILITY

Thus, the present invention provides a two-hand switching device that requires only a small load for each switch operation so that a worker is prevented from suffering from excessive fatigue even after a repeated cycles of operation. Also, the present invention provides a two-hand switch device that can easily detect any improper mode of operation other than the proper mode of operation using the two hands of a worker. The present invention further provides a two-hand switch device that can accurately identify the worker who was actually involved in the operation of the switch device.

| GLOSSARY | |
|---|---|
| 1a | first RFID tag |
| 1b | second RFID tag |
| 2a | left hand RF antenna |
| 2b | right hand RF antenna |
| 2c | transceiver unit (for left hand antenna) |
| 2d | transceiver unit (for right hand antenna) |
| 3 | signal process unit |
| 3a | left hand interface |
| 3b | right hand interface |
| 4 | work piece |
| 5 | hazardous part of a press |
| 6 | presence sensor |
| 7 | reset switch |
| 8 | main switch |
| 9 | work table |
| 10a | left hand |
| 10b | right hand |
| 11 | main switch |
| 12 | emergency stop switch |
| 13a | left hand safe position |
| 13b | right hand safe position |
| 14 | emergency stop switch |
| 15 | screen for preventing improper modes of operation |
| 31 | main control unit |
| 32 | RF antenna interface |
| 33 | configuration input unit |
| 34 | output interface |
| 35 | display unit |
| 100 | two hand switch device |

The invention claimed is:

1. A two-hand switch device, comprising:
a first RFID tag configured to be worn on a pre-determined position of a left hand of a worker;
a second RFID tag configured to be worn on a pre-determined position of a right hand of the worker;
a left hand RF antenna placed in such a position as to enable a communication with the first RFID tag worn on the pre-determined position of the left hand of the worker only when the left hand of the worker is placed in a pre-determined left hand safe position;
a right hand RF antenna placed in such a position as to enable a communication with the second RFID tag worn on the pre-determined position of the right hand of the worker only when the right hand of the worker is placed in a pre-determined right hand safe position; and
an output signal generating means for generating, only when it is determined that a time difference between a left reception time point and a right reception time point is within a tolerance, an output signal according to signals received by the left hand RF antenna and the right hand RF antenna.

2. The two-hand switch device according to claim 1, wherein the output signal generating means generates an output signal of a multi state output type that takes a first logic value at a state where both the signals from the left hand RF antenna and the right hand RF antenna are simultaneously present and otherwise takes a second logic value.

3. The two-hand switch device according to claim 1, wherein the output signal generating means generates an output signal of a multi state output type and generates a one shot pulse upon start and/or upon end of a state where the signals from the left hand RF antenna and the right hand RF antenna are simultaneously present.

4. The two-hand switch device according to claim 1, wherein the first RFID tag stores left hand identification information, and the second RFID tag stores right hand identification information, the output signal generating means generating a pre-determined output signal when the left hand identification information is received by the left hand RF antenna and the right hand identification information is received by the right hand RF antenna.

5. The two-hand switch device according to claim 1, wherein the first RFID tag stores individual worker identification information, and the second RFID tag stores individual worker identification information, the output signal generating means generating a pre-determined output signal when the individual worker identification information received by the left hand RF antenna and the individual worker identification information received by the right hand RF antenna agree with each other.

6. The two-hand switch device according to claim 1, wherein the pre-determined left hand safe position and the pre-determined right hand safe position are located in front of a machine and are laterally spaced apart from each other by a pre-determined distance.

7. The two-hand switch device according to claim 6, wherein the left hand RF antenna and the right hand RF antenna each have a directivity, and are oriented so that the directivities of the two antennas are directed in mutually facing away directions.

8. The two-hand switch device according to claim 6, wherein the left hand RF antenna and the right hand RF antenna each have a directivity, and are oriented so that the directivities of the two antennas are directed in mutually opposing directions, a screen being placed between the two antennas.

9. The two-hand switch device according to claim 4, wherein said device further comprises a configuration input means for configuring a right and left hand identification option, whereby the output signal generating means generates, only when the right and left hand identification option is configured, the pre-determined output signal when the left hand identification information is received by the left hand RF antenna and the right hand identification information is received by the right hand RF antenna.

10. The two-hand switch device according to claim 5, wherein said device further comprises a configuration input means for configuring an individual worker identification option, whereby the output signal generating means generates, only when the individual worker identification option is configured, the predetermined output signal when the individual worker identification information received by the left hand RF antenna and the individual worker identification information received by the right hand RF antenna agree with each other.

* * * * *